US005372341A

United States Patent [19]
Witherbee et al.

[11] Patent Number: 5,372,341
[45] Date of Patent: Dec. 13, 1994

[54] CABLE TRAY HOLD-DOWN DEVICE

[75] Inventors: Martin L. Witherbee, Edwardsville; Eric R. Rinderer, Highland, both of Ill.

[73] Assignee: B-Line Systems, Inc., Highland, Ill.

[21] Appl. No.: 132,751

[22] Filed: Oct. 6, 1993

[51] Int. Cl.⁵ .............................................. F16L 3/00
[52] U.S. Cl. ..................................... 248/49; 248/72; 411/84
[58] Field of Search ....................... 248/49, 58, 62, 72, 248/73, 68.1; 411/84, 85, 169

[56] References Cited

U.S. PATENT DOCUMENTS

| | | | |
|---|---|---|---|
| 2,026,312 | 12/1935 | Houts | 248/49 |
| 4,046,343 | 9/1977 | Kambara | 248/49 |
| 4,285,379 | 8/1981 | Kowalski | 411/85 |
| 5,100,086 | 3/1992 | Rinderer | 248/49 |
| 5,209,619 | 5/1993 | Rinderer | 411/85 |
| 5,271,586 | 12/1993 | Schmidt | 248/58 |

OTHER PUBLICATIONS

Cable Tray Systems, P-W Industries, Inc., Combination Hold Down Clamp and Expansion Guide, 2 pages, date unknown, but admitted prior art, Feasterville, Penn.

Cable Tray Systems, B-Line Systems, Inc., pp. 136, 138 and 139, 1990, Highland, Ill.

Primary Examiner—Ramon O. Ramirez
Attorney, Agent, or Firm—Senniger, Powers, Leavitt & Roedel

[57] ABSTRACT

A hold-down device for holding a cable tray on a support includes a rigid member having opposite side edges, opposite side margins adjacent respective side edges, and opposite end portions. The member may be placed on the support in a position in which the opposite side margins of the member bear on edges of the support with the member overlying the slot adjacent a flange of the cable tray. The member is constructed and arranged such that it is selectively securable to the support by a threaded fastener either in a clamping position in which one end portion of the member overlies the flange of the cable tray and may clamp the flange of the cable tray thereby to hold the rail in fixed position with respect to the support, or in a non-clamping position in which the opposite end portion of the member overlies the flange of the cable tray but cannot clamp the flange thereby to permit lengthwise thermal expansion and contraction of the rail while still holding the rail on the support. First and second anti-spin structures are provided at respective end portions of the member engageable with the support to prevent rotation of the member relative to the support as the threaded fastener is rotated to secure the member in its clamping or non-clamping position.

11 Claims, 6 Drawing Sheets

CABLE TRAY HOLD-DOWN DEVICE

BRIEF SUMMARY OF THE INVENTION

This invention relates generally to support systems, and more particularly to a system for supporting what is referred to in the trade as "cable tray", which is a support structure comprising a pair of parallel rails connected by cross members and used in commercial buildings to support long runs of electrical wiring, conduit and the like.

Cable tray is typically supported by a series of parallel support bars suspended at intervals and spaced lengthwise of the cable tray. The cable tray rests on these support bars and is held in position on the bars by hold-down members which are affixed to the support bars by suitable fasteners (e.g., bolts). These hold-down members are intended to hold the cable tray on the support bars and to Prevent lateral shifting of the cable tray relative to the bars.

Two types of hold-down members are prevalent in the industry, one type for rigidly clamping a cable tray against its support, and a second type which holds the cable tray loosely on the support to permit thermal expansion and contraction of the cable tray due to temperature variations. For reasons of economy, it is preferable to have a single "combination" hold-down member which can be used in either capacity, that is, one which can be selectively applied in either a clamping or non-clamping (expansion) mode. Co-assigned U.S. Pat. No. 5,100,086 shows one such combination hold-down. PW Industries Inc. also markets a combination hold-down. The former, however, is designed to be used in a cable tray system which does not use standard cable tray channel supports, and the latter has several drawbacks, including its tendency to spin when being tightened on a support, and its relatively low strength characteristics.

Among the several objects of this invention may be noted the provision of an improved "combination" hold-down device which may be selectively used in either a clamping or non-clamping (expansion) mode; the provision of such a hold-down device which may be used on supports of standard configuration (e.g., channel or "strut" of standard dimension and design); the provision of such a hold-down device which has an anti-spin feature to prevent the device from spinning relative to the support when the device is tightened on the support in its clamping or non-clamping positions; the provision of such a hold-down device which has increased strength characteristics for holding greater loads; the provision of such a hold-down device which readily accommodates different types of cable tray having rails of different cross sectional shapes and dimensions; and the provision of such a hold-down device which is relatively economical to manufacture and easy to install.

Generally, this invention is directed to a hold-down device for holding a cable tray on a support. The support is of the type having opposing side walls terminating in edges defining a slot therebetween. The cable tray is of the type having a pair of generally parallel rails with flanges extending lengthwise of the rails adapted to bear on the support with the flanges overlying the slot and extending generally transversely with respect to the slot. The hold-down device comprises a rigid, generally rectangular member having opposite side edges, opposite side margins adjacent respective side edges, and opposite end portions. The rigid member is adapted to be placed on the support in a position in which the opposite side margins of the rigid member bear on the edges of the support with the rigid member overlying the slot adjacent a flange of the cable tray. A fastener opening is provided in one end portion of the rigid member. A threaded fastener is insertable inwardly through the fastener opening and through the slot of the support for threaded engagement with a complementary threaded opening associated with the support. The arrangement is such that rotation of the fastener is adapted to fixedly secure the rigid member to the support. The rigid member is selectively securable to the support by the fastener either in a clamping position in which one end portion of the rigid member overlies the flange of the cable tray and is adapted for clamping engagement with the flange of the cable tray thereby to hold the rail in fixed position with respect to the support, or in a non-clamping position in which the opposite end portion of the rigid member overlies the flange of the cable tray but is not adapted for clamping engagement with the flange thereby to permit lengthwise thermal expansion and contraction of the rail while still holding the rail on the support. A first anti-spin structure is formed on said one end portion of the rigid member and configured to project inwardly into the slot and to engage the support at opposite sides of the slot when the rigid member is in its said clamping position thereby to prevent rotation of the rigid member relative to the support as the threaded fastener is rotated to secure the rigid member in its said clamping position. A second anti-spin structure is formed on said opposite end portion of the rigid member and configured to project inwardly into the slot and to engage the support at opposite sides of the slot when the rigid member is in its said non-clamping position thereby to prevent rotation of the rigid member relative to the support as the threaded fastener is rotated to secure the rigid member in its said non-clamping position.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
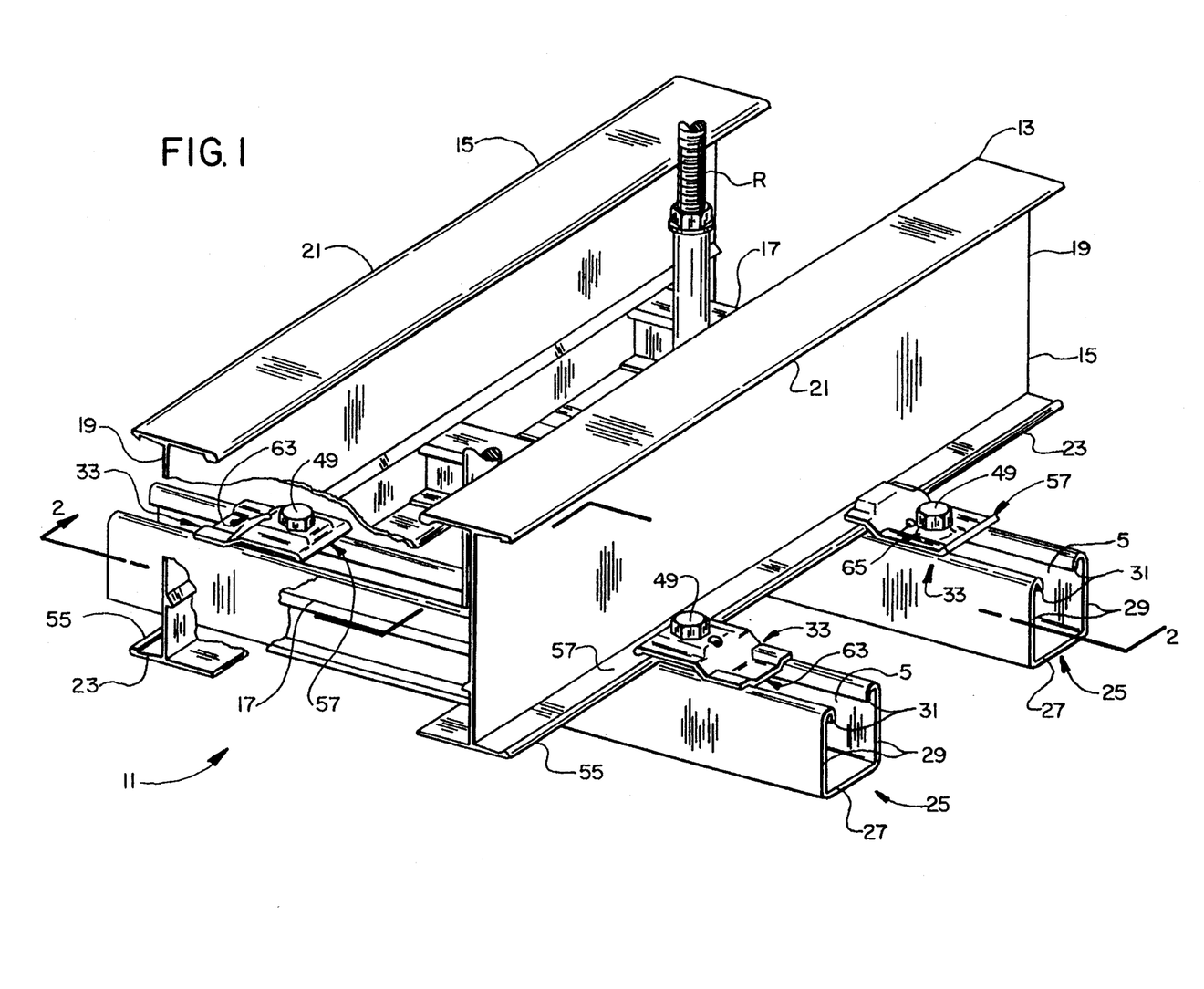
FIG. 1 is a perspective of a cable tray support system utilizing hold-down devices of the present invention.
Figure 2:
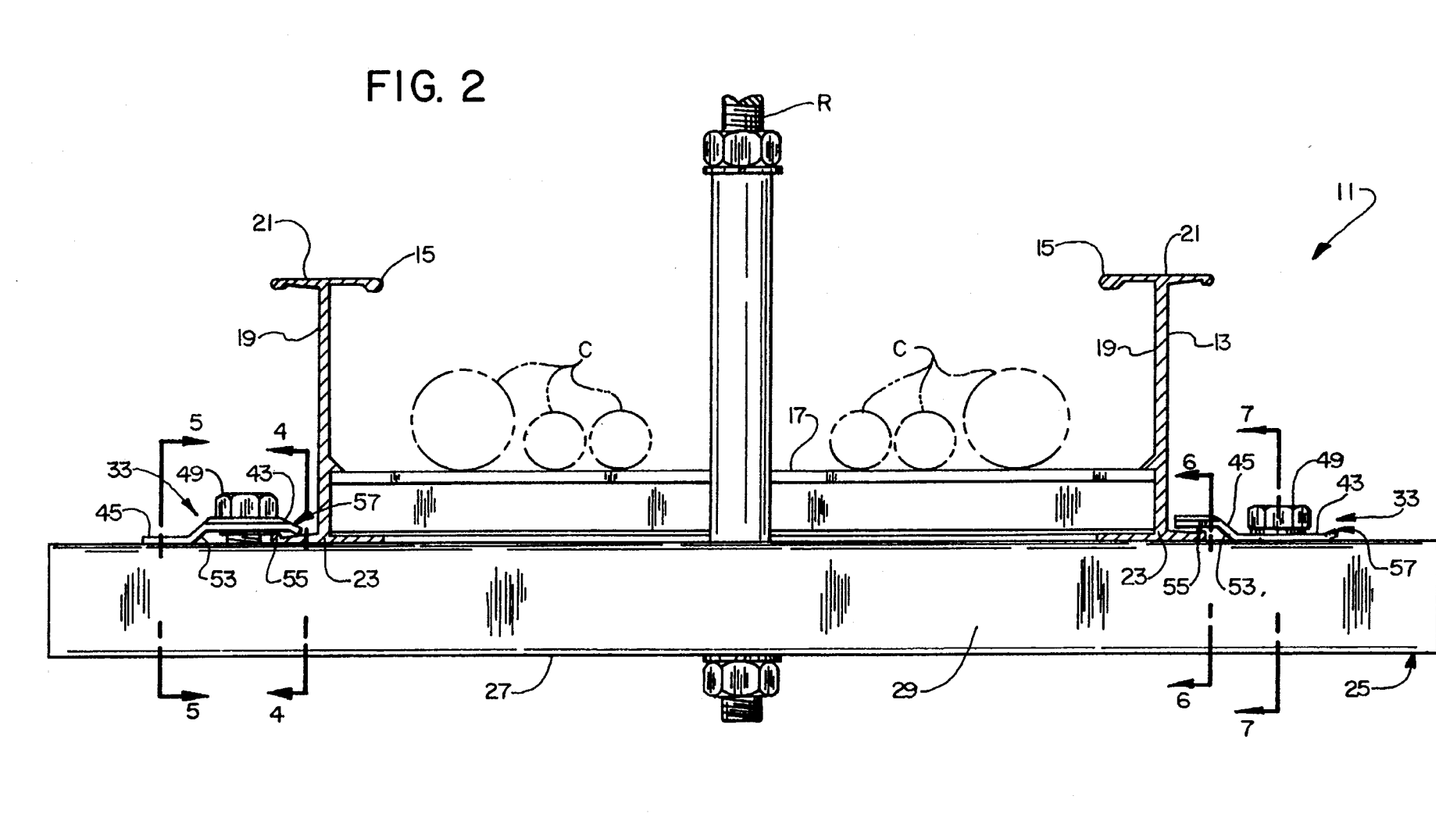
FIG. 2 is an elevational view taken on line 2—2 of FIG. 1 showing one hold-down device mounted on a support bar in a clamping position and another hold-down device mounted on a support bar in a non-clamping position.
Figure 3:
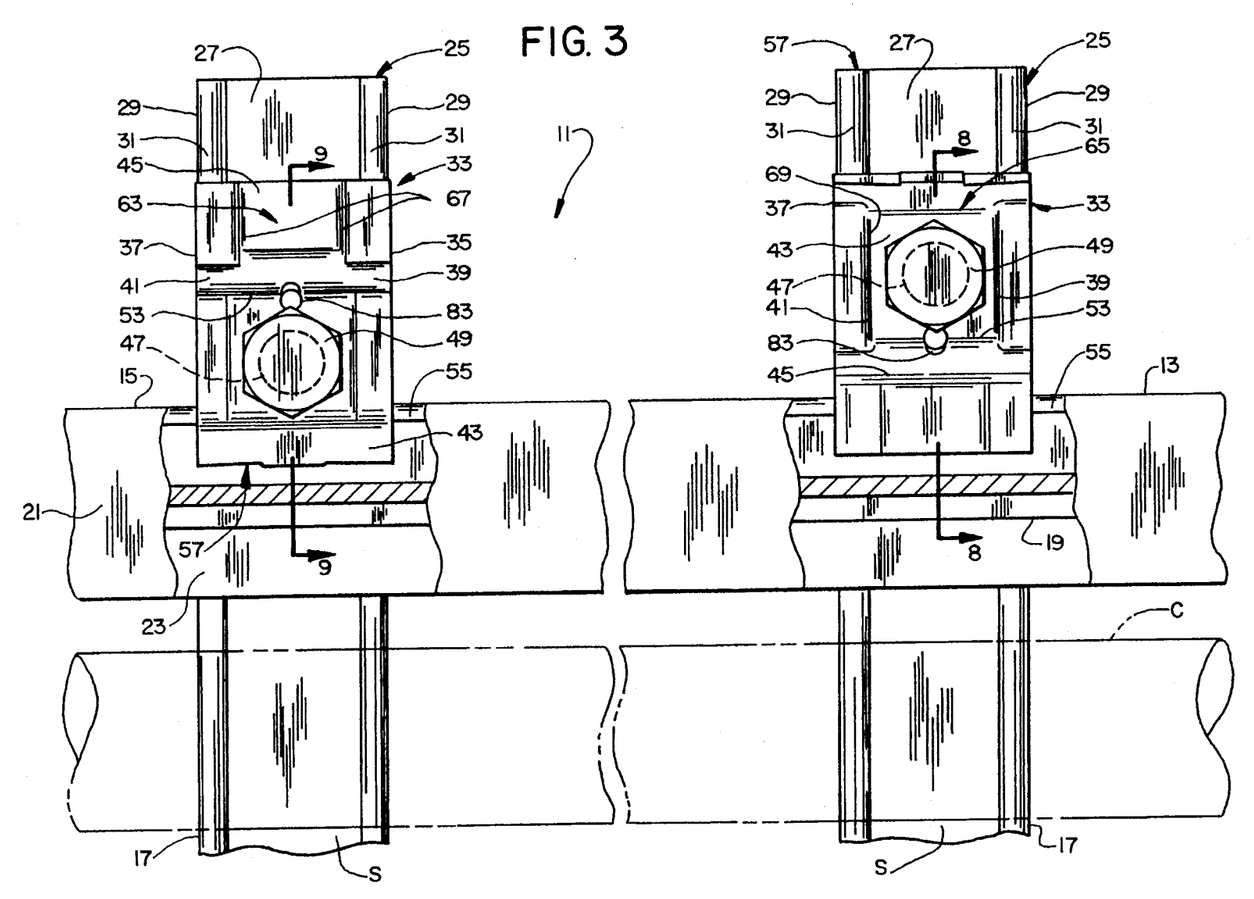
FIG. 3 is an enlarged plan view showing portions of FIG. 1.

Referring now to the drawings, and more particularly to FIG. 1, a support system of the present invention, indicated generally by the reference numeral 11, is shown supporting a run of cable tray indicated generally at 13. As illustrated, the cable tray 13 is of the type comprising a pair of generally parallel side rails, each designated 15, interconnected by a series of parallel, spaced apart cross members 17. The cross-sectional sectional shape of the rails 15 will vary depending on the type of cable tray. For example, the cable tray 13 shown in the drawings has rails 15 formed from aluminum I beams, each having a vertical web 19 and upper and lower horizontal flanges indicated at 21 and 23, respectively, extending laterally from the web on opposite sides of the web. The cable tray 13 is adapted to carry various types of conduit, for example, as indicated in phantom at C in FIGS. 2 and 3.

The support system 11 comprises a series of support bars, each generally indicated at 25, adapted to be suspended (e.g., by rods R) at intervals spaced lengthwise of the cable tray 13 and with the support bars extending generally cross-wise relative to the rails 15 of the cable tray. The rods R suspend the support bars 25 in a manner similar to that shown in U.S. Pat. No. 5,100,086. As shown in FIG. 1, the support bars 25 lie in a single generally horizontal plane. However, it will be understood that the bars could lie in planes other than horizontal for supporting non-horizontal (e.g., vertical) runs of cable tray. Each support bar 25 is of generally U-shape in transverse section, the bar thereby having a bottom wall 27 and two opposing side walls, each designated 29, extending up from the bottom wall and terminating in downwardly turned lips, each designated 31, extending longitudinally of the bar and defining a slot S therebetween. As shown, the rails 15 of the cable tray 13 run transversely with respect to the support bars 25 and rest on the top surfaces of the bars 25 (i.e., on the tops of lips 31).

A pair of hold-down members, each generally indicated at 33, are provided for holding the two rails 15 of the cable tray 13 on each support bar 25. Each hold-down member 33 comprises a rigid, generally rectangular member stamped from suitable sheet metal material (e.g., 12-ga. carbon or stainless steel, or aluminum, or plastic in certain situations, as where plastic cable tray is being installed). Each member 33 has opposite first and second side edges, designated 35, 37, respectively, opposite first and second side margins, designated 39, 41, respectively, spaced inwardly from and adjacent respective side edges 35, 37, and opposite first and second end portions designated 43, 45, respectively. Generally, each hold-down member 33 is configured to be placed on a support bar 25 in a position in which the first and second side margins 39, 41 of the member bear on the lips 31 of the support bar 25 with the member overlying the slot S and with one end portion of the member overlying the lower flange 23 of the cable tray 13.

A fastener opening 47 is provided in end portion 43 of the rigid member 33 for receiving a threaded fastener, e.g., a bolt 49, which is insertable inwardly (downwardly as viewed in the drawings) through the opening and through the slots S of the support bar 25 for threaded engagement with a complementary opening 48 associated with the support bar. As illustrated in the drawings (e.g., FIGS. 8 and 9), this complementary opening is in a channel nut 51 disposed between the side walls 29 of the support bar immediately below its downwardly turned lids 31 (this nut may be of the type shown in co-assigned U.S. Pat. Nos. 5,054,978, 5,067,863 and 5,209,619 but without the disclosed nut retainer or "cage" structures). The arrangement is such that rotation of the bolt to tighten it brings the rigid member 33 and the nut 51 into clamping engagement with the lips 31 of the support bar 25 to secure the rigid member in fixed position on the bar. It is to be understood that other methods of securing the hold-down member 33 to the support bar 25 may be employed. For example, the bolt 37 may be threaded into a complementary tapped hole (not shown) in the bottom wall 27 of the support bar 25, or the bolt may be dimensioned to extend through a non-threaded clearance opening in the bottom wall for threaded engagement with a nut (not shown) on the underside of the support bar.

Figure 8:
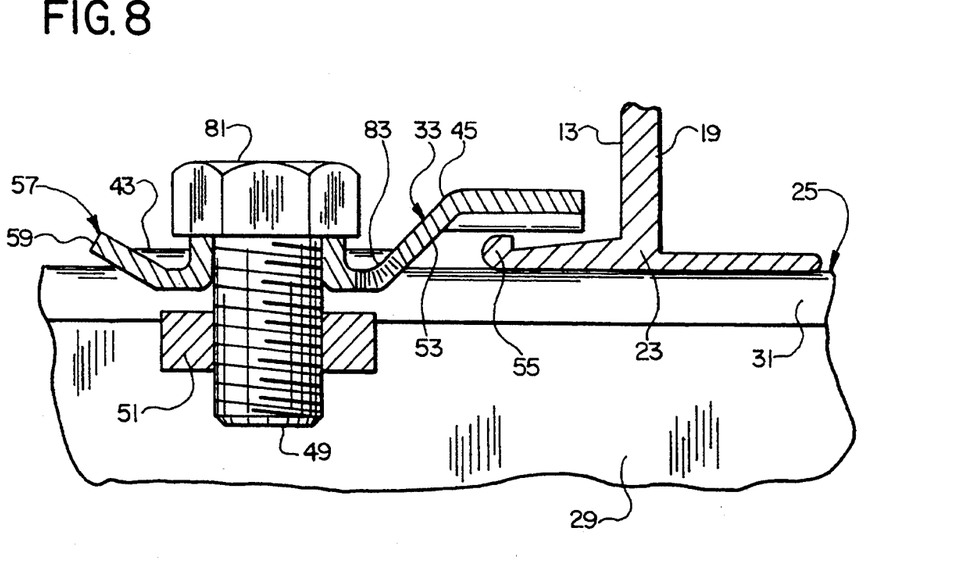
FIG. 8 is an enlarged vertical section taken on line 8—8 of FIG. 3.
Figure 9:
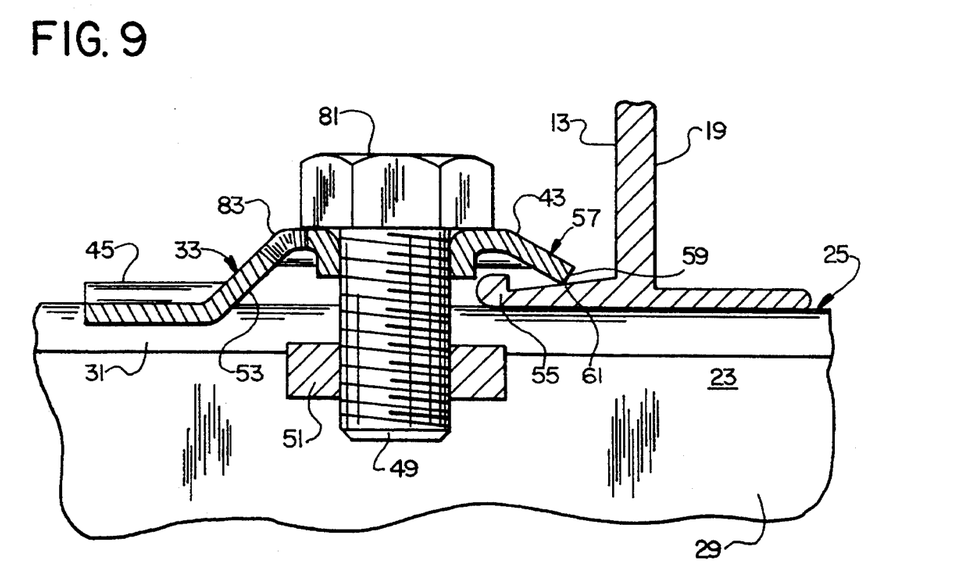
FIG. 9 is an enlarged vertical section taken on line 9—9 of FIG. 3.

The first and second end portions 43, 45 of each member 33 are offset as indicated at 53 in a stepped configuration relative to one another so that the end portions extend away from each other in substantially parallel but offset planes (see FIGS. 8 and 9). The arrangement is such that when the member 33 is secured to the support bar 25 with one end portion (e.g., end portion 45) in engagement with the support bar, the other end portion (e.g., end portion 43) is spaced outwardly from the support bar for bridging over a raised portion or bead 55 typically present on the lower flange 23 of the cable tray 13. Preferably, the offset 53 is dimensioned so that the end portion (e.g., end portion 43) clears the tallest bead 55 provided on standard cable tray while the other end portion (e.g., end portion 45) is resting flat on the support bar.

Figure 4:
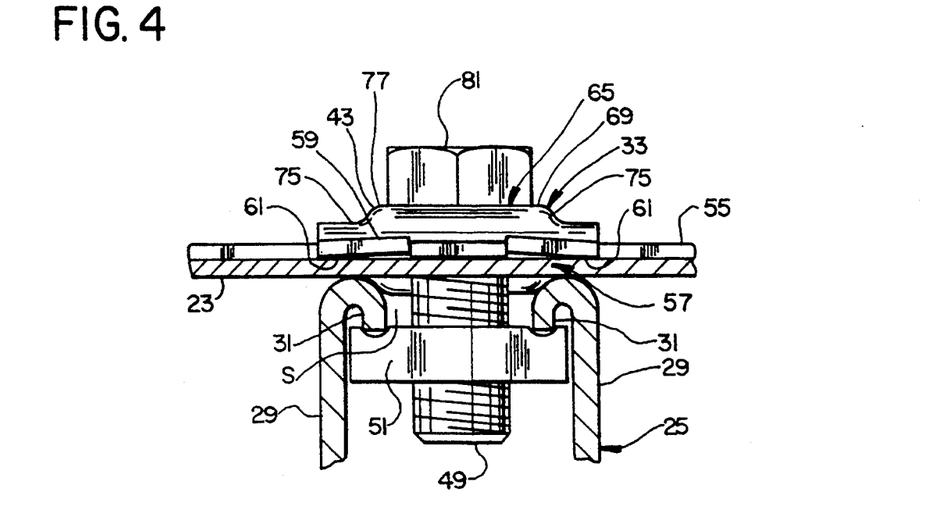
FIG. 4 is an enlarged vertical section taken on line 4—4 of FIG. 2.
Figure 5:
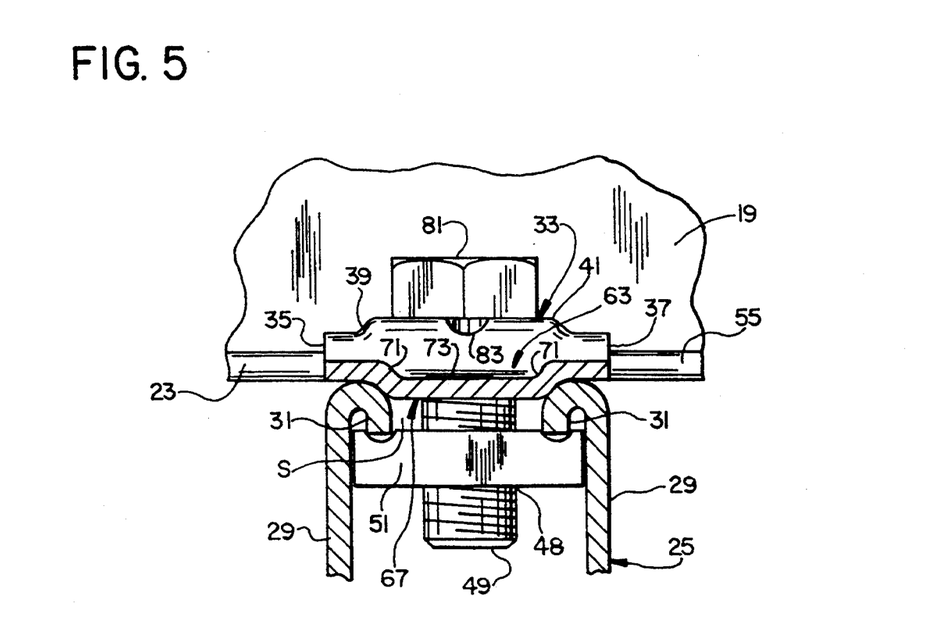
FIG. 5 is an enlarged vertical section taken on line 5—5 of FIG. 2.

The hold-down member 33 includes a clamping formation indicated generally at 57 for clamping engagement with the lower flange 23 of the rail 15. As illustrated in FIGS. 4 and 5, the member 33 is shown as being mounted in what may be referred to as a clamping position in which end portion 43 overlies the lower flange 23 of the cable tray 13 and the clamping formation 57 is in clamping engagement with the flange of the cable tray, thereby holding the rail 15 of the cable tray in fixed position relative to the support bar. The clamping formation 57 is formed so that when the member 33 is in its clamping position, the clamping formation projects inwardly from the member for clamping engagement with the lower flange 23 inboard of the bead 55 of the flange. The clamping formation 57 shown in the embodiment of FIGS. 8 and 9 comprises a lip 59 extending downwardly at about a 45° angle relative to end portion 43 of the member. The lip has two spaced apart teeth, each designated 61, located adjacent opposite side edges 35, 37 of the rigid member 33 for biting into the flange 23 of the cable tray 13. As illustrated in the drawings, the fastener opening 47 is provided in the same end portion 43 having the clamping formation 57 so that when the bolt 49 is tightened, the hold-down member 33 exerts a strong clamping force against the flange 23 of the rail 15.

Figure 6:
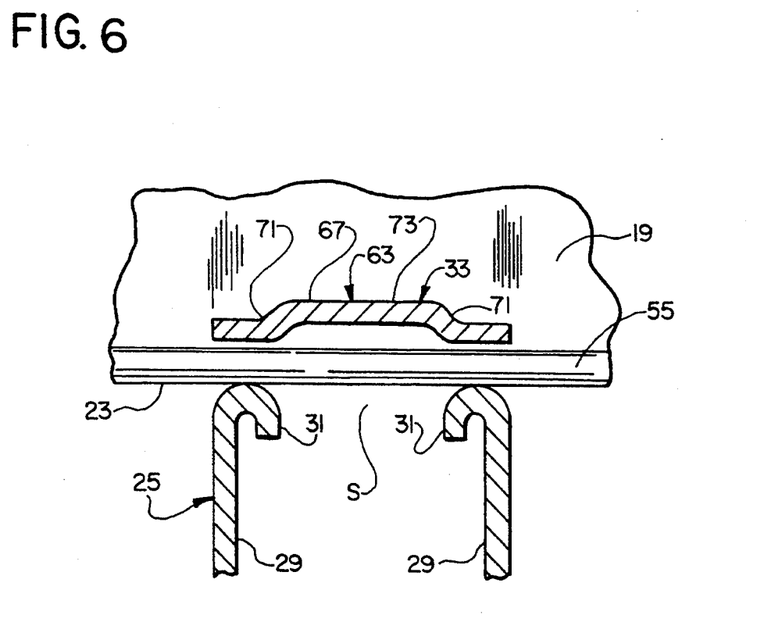
FIG. 6 is an enlarged vertical section taken on line 6—6 of FIG. 2.
Figure 7:
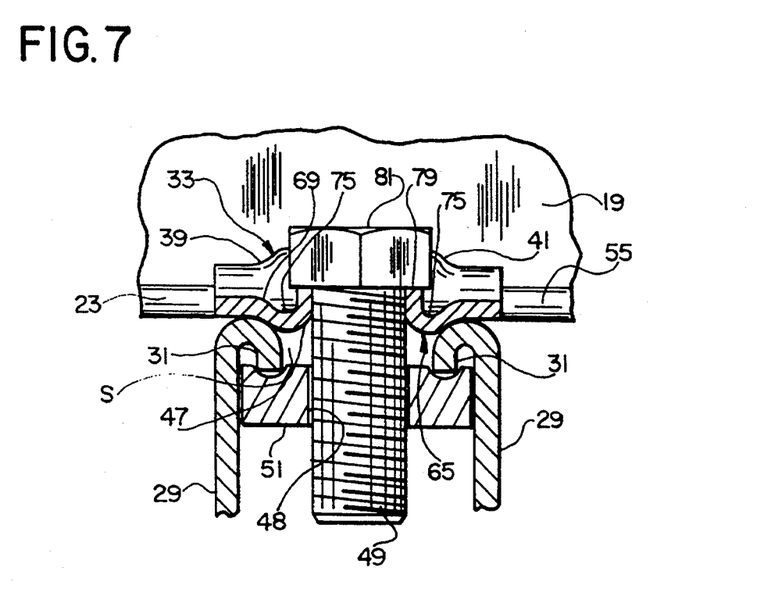
FIG. 7 is an enlarged vertical section taken on line 7—7 of FIG. 2.

In accordance with this invention, the hold-down members 33 may also be selectively mounted on the support bar 25 in a non-clamping position (see FIGS. 6 and 7). In this position, the members 33 are not in clamping engagement with the rails 15 to permit free lengthwise thermal expansion and contraction of the rails relative to the support bar. When installed in a non-clamping position, a member 33 is inverted with respect to its clamping position so that its end portion 43 lies flat on the support bar and its end portion 45 extends over the lower flange 23 of the rail 15 (and the bead 55) to hold the cable tray 13 on the support bar 25. As mentioned earlier, the offset 53 located between the end portions 43, 45 is preferably sufficient to enable the hold-down member 33 to clear (but only slightly) the bead 55 adjacent the outer edge of the lower flange 23. It will be noted that end portion 45 of member 33 has no clamping formation thereon and is spaced above the lower flange of the rail, the design being such that the member functions to hold the cable tray on the support bar 25 while allowing the cable tray to expand and contract due to temperature changes.

Each of the hold-down members 33 of the present invention is provided with first and second anti-spin structures generally indicated at 63, 65, respectively, for preventing rotation of the member relative to the support bar 25 as the bolt 49 is tightened to secure the member in either its clamping position or its non-clamping position. The first anti-spin structure 63 is formed on end portion 45 for preventing rotation of the hold-down member 33 when tightening it in its clamping position. As best illustrated in FIG. 5, the first anti-spin structure 63 comprises a first rib structure 67 on end portion 45 between side margins 39, 41. This rib structure 67 projects inwardly (downwardly) into the slot S of the support bar 25 and engages the lips 31 of the support bar when the hold-down member is in its clampinq position to prevent rotation of the member relative to the support bar. Similarly, the second anti-spin structure 65 is formed on end portion 43 for preventing rotation of the member 33 when tightening it in its non-clamping position. The second anti-spin structure 65 comprises a second rib structure 69 on end portion 43 between side margins 39, 41 as illustrated in FIG. 7. This rib structure 69 projects inwardly (downwardly) into the slot of the support bar 25 and engages the lips 31 of the support bar when the hold-down member 33 is in its non-clamping position to prevent rotation of the member relative to the support bar. As shown, the first and second rib structures 67, 69 project in opposite directions from respective end portions 45, 43 of the hold-down member.

Referring now to FIG. 5, it will be observed that rib structure 67 is generally channel shaped in cross section and has opposite side walls, each designated 71, connected to each other by a horizontal connecting wall 73. When the hold-down member 33 is in its clamping position, the side walls 71 are configured to engage the lips 31 of the support bar 25 at opposite sides of the slot S to prevent rotation of the member relative to the support bar when tightening the bolt 49. Similarly, as shown in FIG. 7, rib structure 69 is generally channel shaped in cross section and has opposite side walls, each designated 75, connected by connecting wall 79. When the hold-down member 33 is in its non-clamping position, as shown, these side walls 75 are configured to engage the lips 31 of the support bar 25 at opposite sides of the slot S to prevent rotation of the member relative to the support bar.

The fastener opening 47 is formed in the connecting wall 77 of the second rib structure 69 and is surrounded by a boss 79 formed by upset metal projecting in the same direction as the first rib structure 67 a distance not substantially less than the height of the side walls 75 of the second rib structure 69 (that is, a distance which places the top of the boss 79 at a level not substantially below the top surfaces of the side edge margins 39, 41). The bolt 49 includes a head 81 which is adapted to bear on the boss 79 as the bolt is tightened in the non-clamping position. The boss 79 strengthens the area around the fastener opening and facilitates tightening of the bolt 49 by maintaining the head 81 of the bolt at an elevation where it is easily accessible and where it may be turned without substantial interference with the side walls 75.

A drain hole 83 is provided in the connecting wall 77 of the second rib structure 69 immediately adjacent the offset 53 for preventing the build up of fluids in the hold-down member 33 when in its clamping position. This helps to avoid corrosion of the hold-down member.

It will be observed from the foregoing that the hold-down member 33 of the present invention has several important advantages. Member 33 is a "combination" hold-down device which may be selectively used in either a clamping or non-clamping mode. Further, the member 33 has an anti-spin feature to prevent the device from spinning relative to the support when the device is tightened on the support in its clamping or non-clamping positions. Moreover, the hold-down member has increased strength characteristics attributable to rib structures 67 and 69 and boss 79 for holding greater loads.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hold-down device for holding a cable tray on a support, said support being of the type having opposing side walls terminating in edges defining a slot therebetween, and said cable tray being of the type having a pair of generally parallel rails with flanges extending lengthwise of the rails adapted to bear on said support with the flanges overlying said slot and extending generally transversely with respect to the slot, said hold-down device comprising a rigid, generally rectangular member having opposite side edges, opposite side margins adjacent respective side edges, and opposite end portions, said rigid member being adapted to be placed on said support in a position in which said opposite side margins of the rigid member bear on the edges of the support with the rigid member overlying the slot adjacent a flange of said cable tray, a fastener opening in one end portion of the rigid member, a threaded fastener insertable inwardly through said fastener opening and through the slot of the support for threaded engagement with a complementary threaded opening associated with the support, the arrangement being such that rotation of the fastener is adapted to fixedly secure the rigid member to the support, said rigid member being selectively securable to the support by said fastener either in a clamping position in which one end portion of the rigid member overlies said flange of the cable tray and is adapted for clamping engagement with said flange of the cable tray thereby to hold the rail in fixed position with respect to the support, or in a non-clamping position in which the opposite end portion of the rigid member overlies said flange of the cable tray but is not adapted for clamping engagement with said flange thereby to permit lengthwise thermal expansion and contraction of the rail while still holding the rail on the support, a first anti-spin structure on said one end portion of the rigid member configured to project inwardly into the slot and to engage the support at opposite sides of the slot when the rigid member is in its said clamping position thereby to prevent rotation of the rigid member relative to the support as the threaded fastener is rotated to secure the rigid member in its said clamping position, and a second anti-spin structure on said opposite end portion of the rigid member configured to project inwardly into the slot and to engage the support at opposite sides of the slot when the rigid member is in its said non-clamping position thereby to prevent rotation of the rigid member relative to the support as the threaded fastener is rotated to secure the rigid member in its said non-clamping position.

2. A hold-down device as set forth in claim 1 wherein said first anti-spin structure comprises a first rib structure on said one end portion of the rigid member between the side margins of the rigid member, and wherein said second anti-spin structure comprises a second rib structure on said opposite end portion of the rigid member between the side margins of the rigid member.

3. A hold-down device as set forth in claim 2 wherein said first and second rib structures project in opposite directions from respective end portions of the rigid member, and wherein said rigid member is invertible relative to the support between its said clamping and non-clamping positions.

4. A hold-down device as set forth in claim 2 wherein each rib structure is generally channel shaped in cross section to have opposite side walls and a connecting wall connecting the two side walls, said side walls of the rib structure being engageable with said support at opposite sides of the slot to prevent said rotation.

5. A hold-down device as set forth in claim 4 wherein said first and second rib structures project outwardly from the rigid member in opposite directions.

6. A hold-down device as set forth in claim 5 wherein said fastener opening is formed in the connecting wall of said second rib structure.

7. A hold-down device as set forth in claim 6 wherein said fastener opening is surrounded by a boss projecting in the same direction as the first rib structure a distance not substantially less than the height of the side walls of said second rib structure, said fastener having a head adapted to bear on said boss as the fastener is tightened in its said non-clamping position.

8. A hold-down device as set forth in claim 1 wherein said first and second end portions of the rigid member are offset in a stepped configuration relative to one another whereby when said rigid member is secured to the support with an end portion in engagement with said support, the other end portion is spaced outwardly from the support for bridging over a raised portion of said flange of the cable tray.

9. A hold-down device as set forth in claim 8 wherein said one end portion of the rigid member has a clamping formation thereon formed so that when the rigid member is in its said clamping position, said clamping formation projects inwardly from said rigid member for clamping engagement with said flange inboard of said raised portion of said flange.

10. A hold-down device as set forth in claim 9 wherein said clamping formation comprises a downwardly extending lip having at least two teeth formed therein.

11. A hold-down device as set forth in claim 9 wherein said fastener opening is formed in said one end portion having the clamping formation so that when the fastener is tightened, the rigid member exerts a strong clamping force against said flange.

* * * * *